United States Patent
Ortmann et al.

(10) Patent No.: US 9,296,380 B2
(45) Date of Patent: Mar. 29, 2016

(54) PRESTROKING ENGINE DISCONNECT CLUTCH IN A HYBRID VEHICLE

(71) Applicant: FORD GLOBAL TECHNOLOGIES, LLC, Dearborn, MI (US)

(72) Inventors: Walter Joseph Ortmann, Saline, MI (US); Francis Thomas Connolly, Ann Arbor, MI (US); Todd McCullough, Bloomfield Hills, MI (US); Brandon R. Masterson, Dexter, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 140 days.

(21) Appl. No.: 14/248,491

(22) Filed: Apr. 9, 2014

(65) Prior Publication Data

US 2015/0291144 A1 Oct. 15, 2015

(51) Int. Cl.
*B60W 10/02* (2006.01)
*B60W 10/08* (2006.01)
*B60W 10/06* (2006.01)
*B60W 20/00* (2006.01)

(52) U.S. Cl.
CPC .............. *B60W 10/02* (2013.01); *B60W 10/06* (2013.01); *B60W 10/08* (2013.01); *B60W 2510/0657* (2013.01); *B60W 2510/083* (2013.01); *B60W 2520/04* (2013.01); *B60W 2710/021* (2013.01); *Y10S 903/902* (2013.01)

(58) Field of Classification Search
CPC ..... B60W 10/02; B60W 10/08; B60W 10/06; B60W 20/40
See application file for complete search history.

(56) References Cited

U.S. PATENT DOCUMENTS

| 2,458,364 A | 1/1949 | Foster |
| 3,131,796 A | 5/1964 | Youngs, III |
| 8,517,156 B2 | 8/2013 | Kim et al. |
| 2007/0275823 A1* | 11/2007 | Motosugi ................. B60K 6/48 477/176 |
| 2010/0227734 A1* | 9/2010 | Wallner ................. B60K 6/365 477/5 |
| 2013/0226384 A1* | 8/2013 | Tanishima ............ B60L 11/123 701/22 |
| 2013/0310217 A1 | 11/2013 | Terakawa et al. |

FOREIGN PATENT DOCUMENTS

| JP | WO2012057085 A1 * | 5/2012 | ............ B60W 20/40 |
| JP | WO2013005844 A1 * | 1/2013 | ............ B60W 10/04 |

* cited by examiner

*Primary Examiner* — Tisha Lewis
(74) *Attorney, Agent, or Firm* — David B. Kelley; Brooks Kushman P.C.

(57) ABSTRACT

A hybrid vehicle includes an engine and an electric machine selectively coupled to one another via a clutch. In one mode of operation, the vehicle can be propelled by only the electric machine while the engine is off. When additional torque is required from the engine, at least one controller transmits an engine start request. In order to start the engine, the clutch can be prestroked such that it fills with pressure prior to the engine to start the engine. While the vehicle is on, at least one controller is programmed to prestroke the clutch prior to the engine start request based at least upon the electric machine and the engine generating substantially zero torque. This reduces the overall engine start time.

15 Claims, 4 Drawing Sheets

PRESTROKING ENGINE DISCONNECT CLUTCH IN A HYBRID VEHICLE

TECHNICAL FIELD

The present disclosure relates to a control of a clutch in a hybrid vehicle that selectively couples an engine to an electric machine.

BACKGROUND

Hybrid vehicles may include an internal combustion engine and an electric machine, either or both capable of providing drive torque. In one such hybrid vehicle, the engine and the electric machine are separated by a clutch. The electric machine may act as the sole power source for a downstream transmission during one drive mode. While operating in this drive mode, the engine may be started to assist the electric machine. Control of the clutch allows the electric machine to act as an engine starter such that torque output of the electric machine rotates the engine prior to the first combustion. Other hybrid vehicle configurations are also known in which a clutch is controlled to selectively transfer torque from an electric motor to start an engine. Control strategies relating to the actuation of the clutch to start the engine must account for efficiency standards, torque disturbances and driver feedback.

SUMMARY

According to one embodiment, a vehicle comprises an electric machine coupled to a transmission. An engine is selectively coupled with the electric machine via a disconnect clutch. At least one controller is programmed to prestrike the disconnect clutch based at least upon the electric machine and the engine generating substantially zero torque while the vehicle is on.

In various embodiments, the at least one controller is further programmed to prestrike the disconnect clutch based additionally upon the vehicle being motionless, prior to a subsequent engine start request, and/or prior to a subsequent depression of an accelerator pedal. The at least one controller can further be programmed to, subsequent to the prestrike of the disconnect clutch, maintain a clutch pressure at a first magnitude prior to a subsequent engine start request.

According to another embodiment, a method of controlling a clutch that selectively couples an engine to an electric machine in a vehicle is provided. The engine and the electric machine are disabled. Based on the disabling, pressure in the clutch is increased based on the disabling while the vehicle is motionless such that the clutch is prestroked prior to a subsequent engine start.

According to yet another embodiment, a computer-implemented control system for reducing engine start time in a vehicle is provided. The system includes an engine, an electric machine, and at least one controller. The electric machine is selectively coupled to the engine via a clutch and is capable of providing torque. The at least one controller is programmed to increase pressure in the clutch prior to an engine start request based at least upon the engine and the electric machine being inactive while the vehicle is on.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
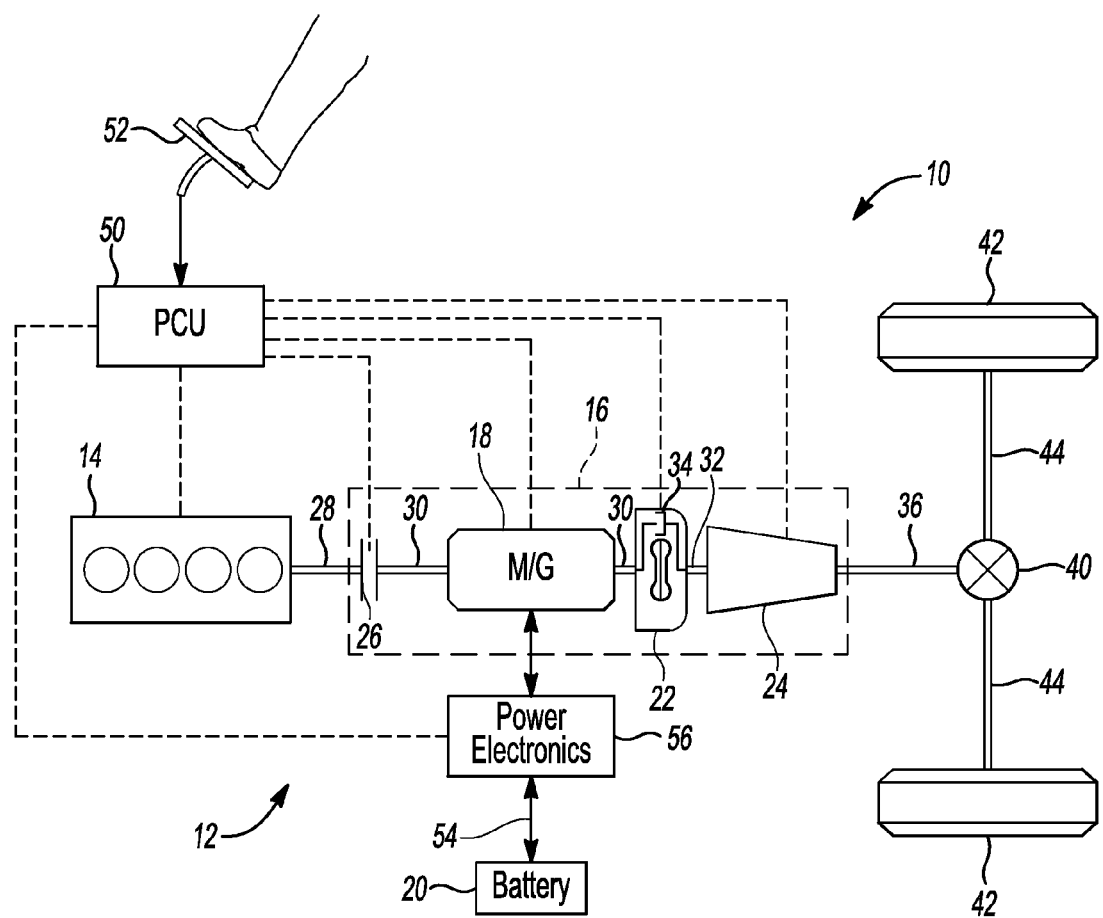
FIG. 1 is a schematic illustration of a hybrid vehicle according to one embodiment of the present disclosure.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). The gearbox 24 then provides powertrain output torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the pedal 52 generates an accelerator pedal position signal that may be interpreted by the controller 50 as a demand for increased power or decreased power, respectively. Based at least upon input from the pedal, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20.

It should be understood that the schematic illustrated in FIG. 1 is merely exemplary and is not intended to be limited. Other configurations are contemplated that utilize selective engagement of both an engine and a motor to transmit through the transmission. For example, the M/G 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

As discussed above, the disconnect clutch 26 acts as a torque transfer mechanism to enable torque to flow between the engine 14 and the M/G 18 when at least partially or fully engaged. The disconnect clutch may be, for example, a hydraulic clutch, a pneumatic clutch, an electro-mechanical clutch, or any other type of clutch known in the art capable of selectively transferring torque therethrough.

In describing the control of the disconnect clutch 26, several references below are made to a "stroked" clutch and an "unstroked" clutch. The term "unstroked" is intended to mean that, in the case of a hydraulic disconnect clutch, no clutch pressure is present in the clutch and the crankshaft 28 and M/G shaft 30 are decoupled from one another. An unstroked disconnect clutch is depressurized, has minimal drag and has no capacity to transmit torque therethrough. In other words, an unstroked disconnect clutch is not activated and is not ready to transmit torque yet. In a "stroked clutch," some pressure is temporarily actuated and held at a relatively low level to "fill" the clutch with hydraulic pressure. The pressure added to the clutch can bring the clutch to its "touch point"— the point where the clutch plates in the disconnect clutch are almost touching but no torque is being transmitted. Any amount of pressure added to the clutch beyond the touch point will cause the clutch to begin transmitting torque.

The terms "stroke" and "unstroke" can apply to not only hydraulic clutches, but other types of clutches as well. Of course, if the disconnect clutch 26 is another type of clutch other than a hydraulic clutch, such as a pneumatic clutch or electro-mechanical clutch, the term "unstroked" can mean that the clutch is entirely inactive or otherwise not close to transmitting torque, while the term "stroked" can mean that the clutch is moved or otherwise prepared such that any additional movement will cause the transmission of torque through the clutch.

When the engine is off, disconnected, and not spinning, the disconnect clutch 26 has generally been unstroked. An unstroked disconnect clutch 26 reduces drag or loss in the clutch. When an engine start request is made, the disconnect clutch 26 must be stroked before the clutch can be capacitized to pull-up and start the engine 14.

Figure 2:
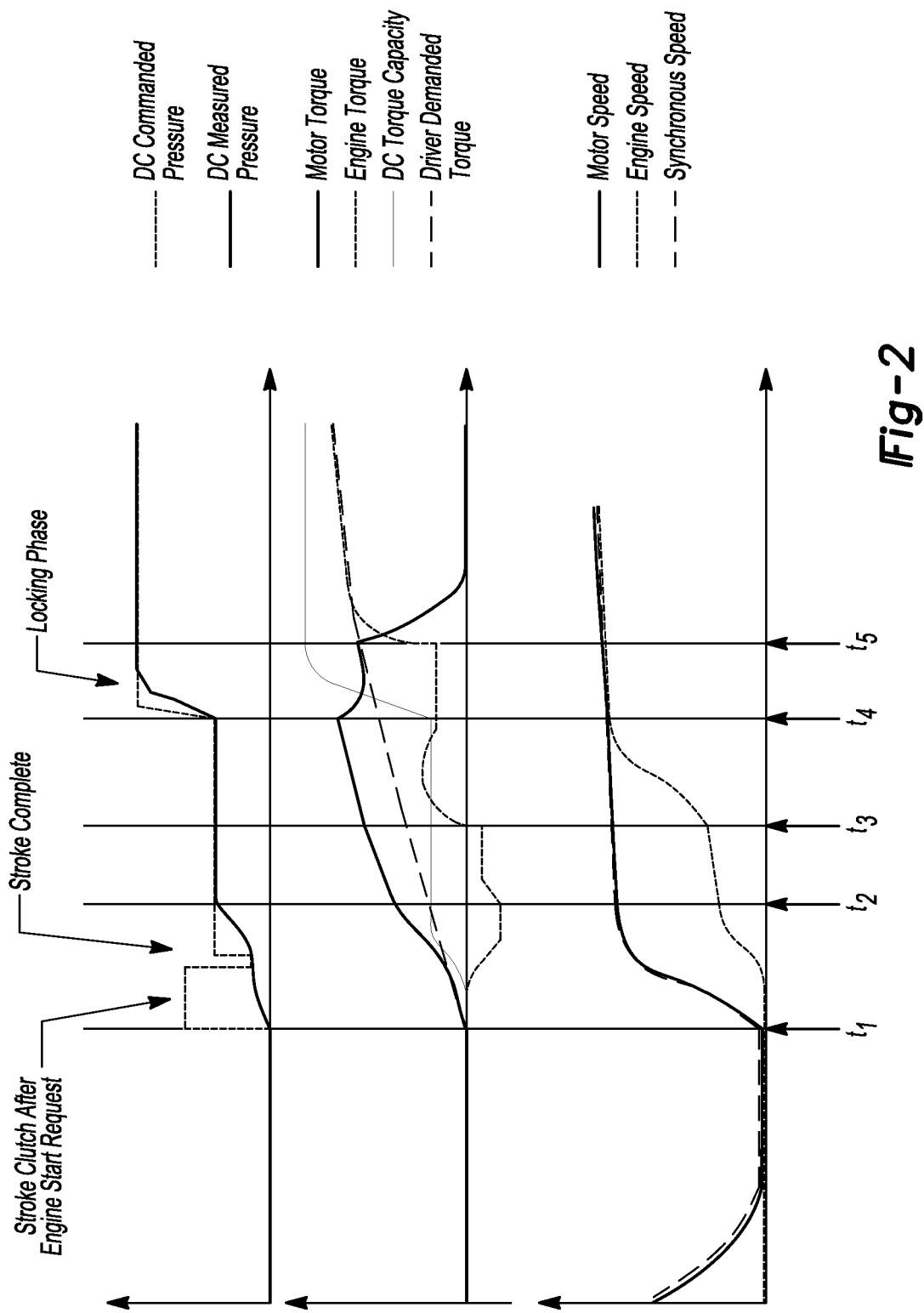
FIG. 2 is a graphical illustration of disconnect clutch pressures, torques, and motor and engine speeds around the time of an engine start request ($t_1$) in which a disconnect clutch is prestroked in response to the engine start request.

One example of such operation is shown in FIG. 2. Prior to $t_1$, the vehicle is coming to a stop as the M/G speed reduces to zero. With the vehicle at rest, an acceleration demand is made at $t_1$ by way of, for example, a depression of the accelerator pedal. The M/G fulfills the driver demanded torque while the engine is prepared to start. In order to start the engine, the controller commands an increase in the disconnect clutch pressure. A "stroking phase" begins at $t_1$ in which the clutch torque capacity remains zero while the clutch pressure is increased in order to prepare the coupling of the engine crankshaft to the M/G shaft. The amount of time elapsed in the stroking phase to stroke the disconnect clutch directly contributes to the amount of time that elapses between the engine start request and the actual engine start.

At a point between $t_1$ and $t_2$ at the end of the stroking phase, the disconnect clutch has been fully pressurized such that the clutch can begin transmitting torque and the crankshaft can begin rotating. As the engine is pulled-up and the torque capacity of the clutch increases, drag occurs in the engine, causing a negative amount of torque to be realized in the engine prior to any combustion. While the actual pressure in the disconnect clutch increases toward (and/or is maintained at) its commanded pressure amount, the engine is able to be pulled-up with a first compression event occurring at $t_2$. This reduces the amount of negative torque in the engine. At $t_3$, a first combustion event occurs and the engine is able to provide positive torque and assist the M/G in propelling the vehicle. The torque and speed of the engine sharply increases following the first combustion event. This can reduce the amount of torque required by the M/G to meet the driver demanded torque, depending on the amount of slip present in the disconnect clutch.

At $t_4$, the speed of the engine has risen such that it is equivalent to the speed of the M/G. Thus, the speeds of the engine and M/G are synchronized, and the disconnect clutch can lock the crankshaft and the M/G shaft by increasing the clutch pressure. The time between $t_4$ and $t_5$ can be referred to as a "locking phase," until the disconnect clutch is completely locked at $t_5$. Once the disconnect clutch is locked to couple the engine with the M/G, the engine is able to provide the necessary torque to meet the driver demands. This allows the M/G torque to reduce in order to, for example, absorb torque from the engine or braking system to charge the battery.

As is apparent from FIG. 2, there exists a slight delay in starting the engine due to the stroke phase between $t_1$ and $t_2$. The stroke phase assures the output of the engine remains nonexistent while the clutch is pressurized to prepare for the engine start. This delay in engine start time can be undesirable at times in which immediate engine torque is required to fulfill a sharp increase in driver demanded torque.

According to multiple embodiments, the present disclosure contemplates prestroking the disconnect clutch prior to a subsequent engine start request. In other words, the controller can command the disconnect clutch to be pressurized and stroked before any request is made to start the engine. In order to do so, a minimal pressure can be applied to stroke the clutch without allowing torque to be transmitted through the clutch. For example, the clutch can be prestroked such that it remains at its touch point prior to any subsequent request for an engine start. This eliminates the delay in starting the engine, as will be described with reference to FIGS. 3-4.

Figure 3:
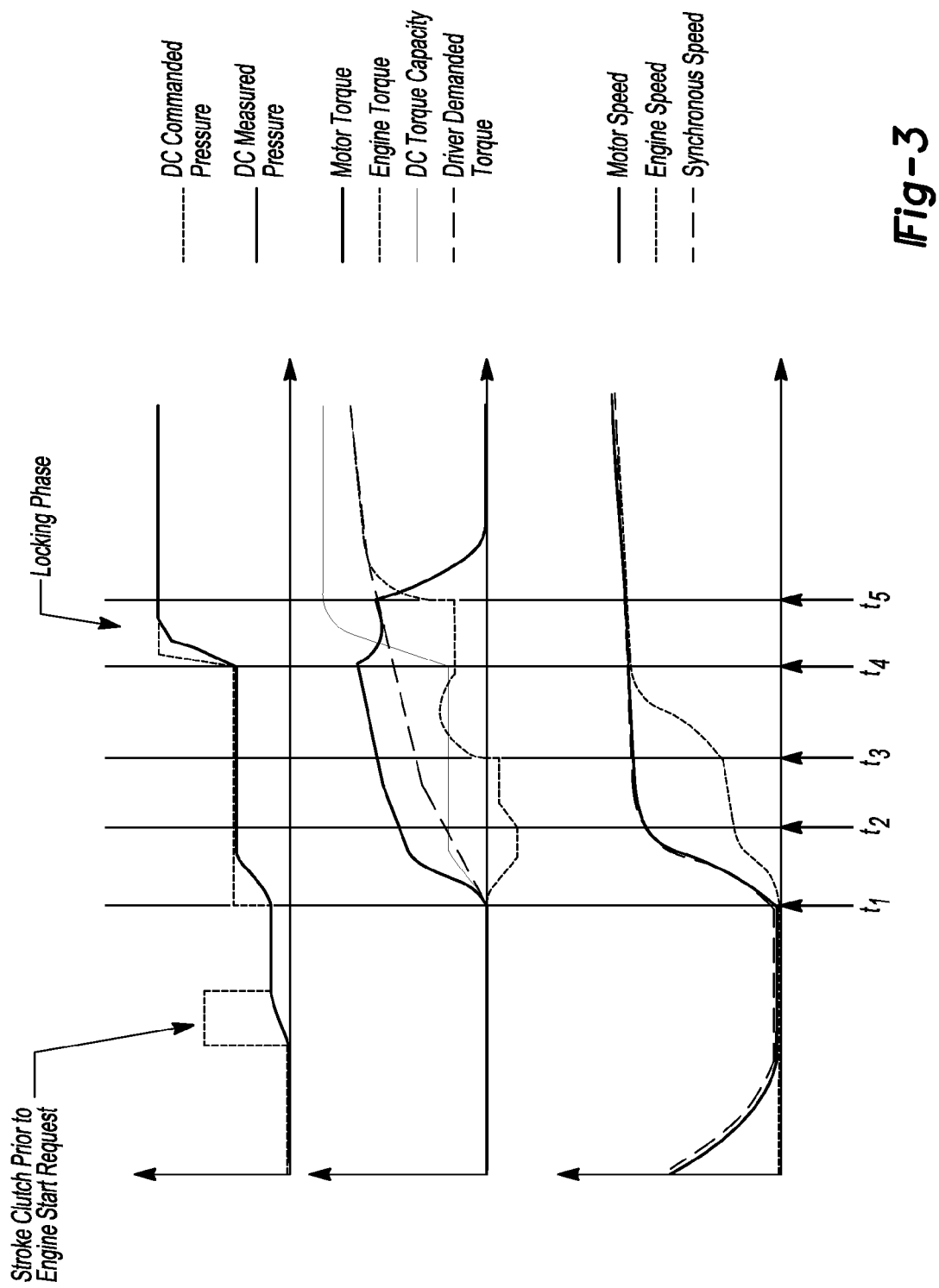
FIG. 3 is a graphical illustration of the disconnect clutch pressures, torques, and motor and engine speeds around the time of the engine start request ($t_1$) in which a disconnect clutch is prestroked prior to the engine start request.

FIG. 3 illustrates a sequence diagram in which the disconnect clutch is stroked prior to a subsequent engine start request. This can be referred to as "prestroking" the disconnect clutch. As seen in the Figure, the controller commands the initial increase in clutch pressure prior to the engine start request. This prestroking of the disconnect clutch enables the engine to be started quicker than vehicles utilizing the control strategy illustrated in FIG. 2. During this prestroking, the controller commands hydraulic fluid to fill the clutch with enough pressure to bring the clutch to its touch point while the engine and motor are both inactive.

Multiple embodiments are contemplated as methods of filling the clutch with the proper pressure for the clutch to reach its touch point without coupling the engine to the motor. In one example, velocity sensors are provided on opposing clutch plates to determine relative speeds between the two sides of the clutch. Other methods and control strategies are contemplated in which one of ordinary skill in the art would apply to properly determine an amount of hydraulic pressure that can prestroke the clutch without sacrificing loss in spinning the crankshaft.

As briefly described, in comparing the Figures, it is clear that the stroking phase that occurred after the engine start request in FIG. 2 now occurs prior to the engine start request in FIG. 3. By shifting the stroking phase back in time, the engine is able to start quicker and provide positive torque more immediately. Use of this prestroking can be implemented by the controller based on scenarios in which the engine is stopped (operating in EV mode) and the M/G is also stopped because the vehicle has come to a stop. If the disconnect clutch is prestroked in this condition, there is no slipping torque loss because the M/G is stopped. Therefore, the controller can be programmed to prestroke the disconnect clutch according to methods described herein in response to the engine and M/G both generating substantially zero torque while the vehicle has come to a rest. The term "substantially zero torque" is intended to mean that the engine and electric machine are either producing zero torque to the wheels, are producing only minimal torque to power accessories, or are providing power to other aspects in the vehicle without providing the necessary amount to the wheels to even slightly propel the vehicle.

It may be undesirable to maintain the clutch stroked and pressurized while the M/G is spinning while driving in the EV mode due to spin losses. Therefore, the controller can be programmed to destroke the clutch during the EV driving mode. However, during the EV driving mode, if the M/G comes to a stop (i.e., the vehicle stops), there are no such issues of spin loss and the disconnect clutch can be prestroked without sacrificing efficiencies.

As can be seen in FIG. 3, prestroking the disconnect clutch prior to the engine start request reduces overall engine start time. First, the clutch pressure can be maintained at a first magnitude until the engine start request. Upon the engine start request, the engine speed is able to ramp up immediately, and much quicker than in FIG. 2. Engine torque immediately reduces, indicating the loss of the engine spinning prior to the first combustion. The controller can then be programmed to increase the clutch pressure to a second magnitude greater than the first magnitude based upon the engine start request in order to facilitate the full engine start. The controller can be further programmed to then increase the clutch pressure to a third magnitude during the locking phase. By implementing the prestroking control strategy, the overall engine start time can be reduced by an approximate factor of one third to one half in some embodiments.

Figure 4:
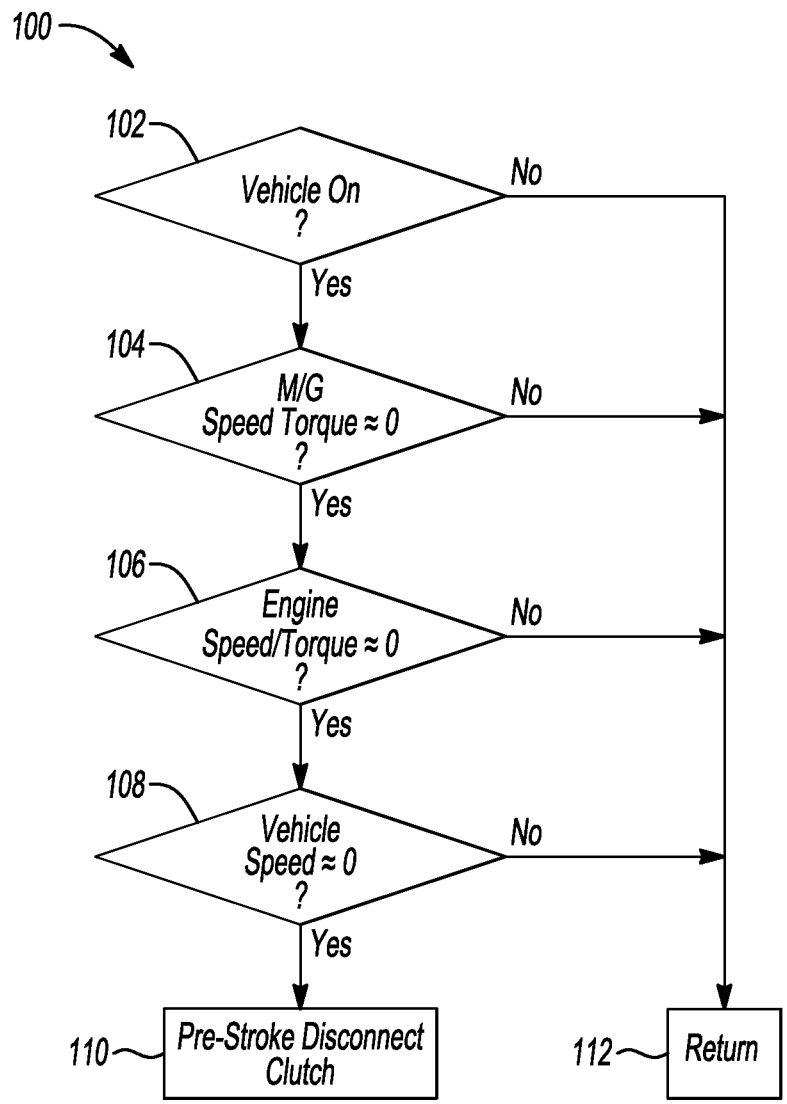
FIG. 4 is a flow chart illustrating a method of prestroking the disconnect clutch in order to reduce engine start time according to one embodiment of the present disclosure.

FIG. 4 shows a flow chart illustrating a method 100 of implementing the prestroking control strategy described above. At 102, the controller determines whether the vehicle is on. This can be determined by, for example, a key being in the "on" position or other such position that would enable the vehicle to be shifted into gear (if necessary) and immediately driven based upon accelerator pedal displacement. At 104, the controller determines whether the speed of the M/G is approximately or exactly 0 (i.e., not rotating). At 106, the controller similarly determines whether the speed of the engine is approximately or exactly 0 (i.e., not rotating). Alternatively or additionally, the controller can be programmed to determine at 104 and 106 the respective torque outputs of the M/G and engine. The controller can also be programmed to determine whether the vehicle is motionless at 108 by utilizing, for example, wheel speed sensors.

If the controller determines that the M/G, the engine, and the vehicle are all motionless, the controller commands a prestroke of the disconnect clutch according to methods described above at 110. However, if any of the outcomes of 104, 106, or 108 are negative, the method returns at 112 and the disconnect clutch is not prestroked. This assures that the clutch is only prestroked in situations in which spin loss would not be realized. When the vehicle, the M/G, and the engine are at rest, there is no drag loss associated with keeping the disconnect clutch stroked or prestroked. This prestroking prepares the engine for a quick start without sacrificing fuel efficiency in doing so.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   an electric machine coupled to a transmission;
   an engine selectively coupled with the electric machine via a disconnect clutch; and
   at least one controller programmed to prestroke the disconnect clutch based at least upon the electric machine and the engine generating substantially zero torque while the vehicle is on and motionless.

2. The vehicle of claim 1, wherein the at least one controller is further programmed to prestroke the disconnect clutch prior to a subsequent engine start request.

3. The vehicle of claim 1, wherein the at least one controller is further programmed to prestroke the disconnect clutch prior to a subsequent depression of an accelerator pedal.

4. The vehicle of claim 1, wherein the at least one controller is further programmed to, subsequent to the prestroke of the disconnect clutch, maintain a clutch pressure at a first magnitude prior to a subsequent engine start request.

5. The vehicle of claim 4, wherein the at least one controller is further programmed to increase the clutch pressure to a second magnitude greater than the first magnitude based upon the engine start request.

6. A method of controlling a clutch that selectively couples an engine to an electric machine in a vehicle, comprising:
   disabling the engine and the electric machine; and
   increasing a pressure in the clutch based on the disabling while the vehicle is motionless such that the clutch is prestroked prior to a subsequent engine start.

7. The method of claim 6, wherein the increasing includes increasing the pressure to a magnitude less than a threshold magnitude in which torque is transmitted through the clutch.

8. The method of claim 6, further comprising increasing output of the electric machine to propel the vehicle while maintaining the pressure in the prestroked clutch at a first pressure magnitude.

9. The method of claim 8, further comprising increasing the pressure in the prestroked clutch to a second pressure magnitude and starting the engine in response to an engine start request.

10. The method of claim 8, further comprising decreasing the pressure in the prestroked clutch in response to a time elapsing without an engine start request after the increasing of the output of the electric machine.

11. The method of claim 6, wherein the increasing the pressure in the clutch is also based on the electric machine and the engine generating substantially zero torque.

12. A computer-implemented control system for reducing engine start time in a vehicle, comprising:
   an engine;
   an electric machine selectively coupled to the engine via a clutch and capable of providing drive torque;
   at least one controller programmed to increase pressure in the clutch prior to an engine start request based at least upon the engine and electric machine being inactive while the vehicle is on and motionless.

13. The system of claim 12, wherein the at least one controller is further programmed to maintain the pressure in the clutch until the engine start request.

14. The system of claim 13, wherein the at least one controller is further programmed to further increase the pressure in the clutch in response to the engine start request such that torque is transmitted through the clutch and the engine is started.

15. The system of claim 12, wherein the at least one controller is further programmed to, prior to the engine start request, maintain the pressure in the clutch at a magnitude such that no torque is transmitted through the clutch.

* * * * *